United States Patent Office 3,674,465
Patented July 4, 1972

3,674,465
RECOVERY OF NICKEL FROM NICKEL AMMONIUM CARBONATE SYSTEMS
David J. I. Evans, North Edmonton, Alberta, and Donald Robert Weir, North Saskatchewan, Alberta, Canada, assignors to Sherritt Gordon Mines Limited, Toronto, Ontario, Canada
No Drawing. Filed May 6, 1970, Ser. No. 35,273
Claims priority, application Canada, Oct. 16, 1969, 65,004
Int. Cl. C22b 23/04
U.S. Cl. 75—108                                               7 Claims

ABSTRACT OF THE DISCLOSURE

Contamination of product nickel produced by direct hydrogen reduction from nickel bearing aqueous ammonium carbonate systems by zinc and other undesirable metal impurities is avoided by adjusting the sulphate ion content of the system subjected to the hydrogen reduction treatment such that it is at least equal to the stoichiometric amount required to combine with the contaminant metals in the system to form sulphates. The sulphate ion adjustment is effected by the addition to the system prior to reduction of a sulphate compound, for example, ammonium sulphate, which will dissolve in the system and form soluble sulphates with the contaminate metals but which will not add cations to the system which will precipitate with and contaminate the nickel powder produced in the subsequent hydrogen reduction step. The sulphate ion content may also be adjusted by providing oxidizable sulphur values in the system and reacting the system with oxygen at elevated temperature and pressure to convert the added sulphur values to sulphate form.

---

This invention relates to a method for recovering substantially pure nickel from nickel bearing aqueous ammonium carbonate systems containing impurities such as zinc, magnesium and manganese.

It is known to treat nickel and cobalt bearing limonitic and serpentinic ores, such as occur in Cuba for example, by first roasting the ore under reducing conditions to selectively convert nickel and cobalt oxides in the material to a form soluble in ammoniacal solution and then leaching the reduced material with ammoniacal ammonium carbonate solution under oxidizing conditions to extract the nickel and cobalt. The nickel and cobalt may be recovered from leach liquors obtained in this manner simply by boiling the solution to drive off ammonia and carbon dioxide to precipitate dissolved nickel and cobalt in the form of basic carbonate compounds. The precipitate may then be heated to convert it to a mixed nickel-cobalt oxide product.

It is also known to treat the leach liquors to selectively remove the cobalt prior to the boiling step in order to produce basic nickel carbonate precipitate substantially free from undesirable cobalt contamination.

An alternative procedure for recovering nickel from such ammonium carbonate leach liquors is described in Canadian Patent No. 811,079. This process, which has the advantage of enabling the production of the nickel in metallic powder form, involves re-dissolving basic nickel carbonate precipitate from the leach solution in aqueous ammoniacal ammonium carbonate solution, separating insoluble impurities from the resulting nickel ammonium carbonate solution, adjusting the ammonia and carbon dioxide contents of the solution, reacting the adjusted system with oxygen to oxidize all sulphur values to sulphate form and reacting the oxidized system with hydrogen at elevated temperature and pressure to precipitate nickel in elemental powder form. In cases where the sulphur content of the leach solution is relatively high, e.g. in the order of 1% by weight or more, the process of the prior patent may include the additional step of contacting the basic nickel carbonate precipitated from the leach solution with a soluble sodium compound such as sodium carbonate which is capable of combining with sulphate ions to form sodium sulphate. While this process is generally effective in producing nickel which is substantially free of contamination by sulphur and silica, the product often contains an undesirable amount of zinc as well as other metal impurities such as magnesium and manganese which usually are present in the leach solution derived from ammoniacal ammonium carbonate leaching of reduced lateritic ores.

Reduced nickel and cobalt bearing lateritic ores normally contain various amounts of other metal values including zinc, magnesium and manganese which tend to dissolve in and contaminate the ammonium carbonate leach solution. Manganese goes into solution in a low valent form and is then oxidized during the leach to the manganic state. In this state, it forms compounds which are insoluble in ammonia-ammonium carbonate solution. However, in practice, some manganese is not oxidized and remains in the leach solution. In addition, zinc is highly soluble in the leach solution and, along with magnesium, is not oxidized to an insoluble form during the oxidation leach. These impurities tend to contaminate the basic nickel carbonate precipitated from the leach solution and also remain with the nickel powder obtained by direct reduction of the basic nickel carbonate.

An important object of the present invention, therefore, is to provide a process whereby nickel may be recovered, substantially free of contamination by zinc and other metal impurities, by direct hydrogen reduction from nickel bearing aqueous ammonium carbonate systems containing small but contaminating amounts of these impurities. The term "nickel bearing aqueous ammonium carbonate systems" as used herein includes systems in which all contained nickel is in solution as a complex nickel ammine carbonate as well as systems in which all or any part of the nickel is in the form of solid basic nickel carbonate particles suspended in aqueous media.

According to the present invention, contamination of product nickel produced by direct hydrogen reduction from nickel bearing aqueous ammonium carbonate systems by zinc and other undesirable metal impurities is avoided by adjusting the sulphate ion content of the system subjected to the hydrogen reduction treatment such that it is at least equal to the stoichiometric amount required to combine with the contaminant metals in the system to form sulphates.

More specifically, the present invention provides an improvement in the method for the production of nickel from nickel bearing aqueous ammoniacal ammonium carbonate systems containing metal impurities including at least one of zinc, magnesium and manganese in which the system is reacted with hydrogen at elevated temperature and pressure to precipitate nickel in elemental form, which improvement enables production of nickel in elemental form substantially free from contamination by said impurities and which comprises adjusting the sulphate ion content of the system prior to said reaction with hydrogen to provide at least the stoichiometric amount of sulphate ions require to combine with the said metal contaminants in the system as soluble sulphates. Preferably, the sulphate ion adjustment is effected by the addition to the system prior to reduction of a sulphate compound, for example, ammonium sulphate, which will dissolve in the system and form soluble sulphates with the contaminate metals but which will not add cations to the system which will precipitate with and contaminate the nickel powder produced in the subsequent hydrogen reduction step. The sulphate ion content may also be adjusted by providing oxidizable sulphur values in the system and reacting the system with oxygen at elevated temperature and pressure to convert the added sulphur values to sulphate form. In this case, it is also desirable to adjust the ammonia content of the system prior to reduction such that there is at least sufficient ammonia therein to form ammonium sulphate with any sulphate ions present in the system in excess of those required to satisfy the stoichiometric requirements of the metal impurities as sulphates.

The method of the present invention is applicable to any ammoniacal ammonium carbonate systems containing economically recoverable amounts of nickel and undesirable metal contaminants including particularly zinc, magnesium and manganese. However, the process has particular utility when applied to systems derived from ammonium carbonate leaching of reduced nickeliferous laterites, and it will therefore be described in detail hereinbelow as so used.

According to a preferred form of the reduction-ammonium carbonate leach process for recovering nickel from laterites, the ore is dried, sized and/or ground as required then fed to a furnace wherein it is reacted under controlled conditions with reductants such as coal, hydrogen or producer gas, to convert the nickel oxides in the material to a form soluble in ammoniacal ammonium carbonate solution with a minimum accompanying reduction of iron oxide to soluble form.

The calcined ore is leached with aqueous ammoniacal ammonium carbonate solution under oxidizing conditions to obtain maximum extraction of nickel. Leaching is conducted at ambient temperatures in the presence of free oxygen which is provided, for example, by sparging air into the leach vessel. Leaching preferably is continued to obtain optimum dissolution of nickel regardless of the amount of carbonate forming impurities such as zinc, magnesium and manganese, which may be dissolved in the leach solution. Because of the relatively low nickel content of the reduced ore and the practical necessity of conducting the leaching operation at a solids content within a range which permits efficient leaching (usually 15–40% by weight solids), leach solution generally is recycled as required to build up the nickel content to 8–15 g.p.l. at which level the solution can be economically processed further for the recovery of dissolved nickel.

The leach solution is separated from the leach residue such as by thickening and filtration Preferably, substantially all of any dissolved cobalt is stripped from the recovered leach solution and the leach recycle solutions by reacting the solutions with a sulphidizing agent such as $H_2S$, $(NH_4)_2S$ or $Na_2S$ to precipitate the cobalt, usually together with a small amount of nickel, as a mixed cobalt-nickel sulphide.

The final product from the leaching operation therefore is a substantially cobalt-free ammoniacal nickel ammonium carbonate solution containing from about 8 to about 15 grams per litre of dissolved nickel. The solution also normally contains sulphur, and metal impurities including zinc, magnesium and manganese.

The leach solution is next treated in a boiling or distilling step to remove ammonia and carbon dioxide to precipitate the dissolved nickel as basic nickel carbonate. In this operation, in order to obtain substantially complete precipitation of nickel as basic nickel carbonate and, at the same time, avoid sulphur contamination in the basic nickel carbonate precipitate, it is necessary to provide a sodium compound in the leach solution which will tie up sulphate sulphur as sodium sulphate. The preferred sodium compound is sodium carbonate although other sodium compounds, such as sodium bircarbonate and sodium hydroxide may also be used. The sodium compound ties up available sulphate ions in the solution as sodium sulphate, preventing formation of nickel sulphate which tends to remain in the solution during boiling thus causing the loss of a portion of the nickel content of the leach solution. The sodium sulphate which is formed is highly soluble and is readily separated from the basic nickel carbonate precipitate by filtration and washing of the precipitate.

The basic nickel carbonate precipitated from the leach solution may be slurried in aqueous media and reduced directly to elemental form by reaction with hydrogen at elevated temperature and pressure. However preferably the precipitate is redissolved in a substantially pure aqueous ammoniacal ammonium carbonate solution to produce ammoniacal nickel ammine carbonate solution containing up to about 150 grams per litre of dissolved nickel and preferably about 50–80 grams per litre nickel at an ammonia to nickel molar ratio greater than 4:1 and a $CO_2$ to nickel ratio up to about 2.0:1. It is desirable to sparge air into the system during this redissolution step to minimize iron and manganese dissolution. A part of the magnesium and manganese will dissolve in this step and a part will remain in the slimy residue. Most of the zinc will dissolve. The redissolution step provides a concentrated ammoniacal nickel ammine carbonate solution suitable for subsequent treatment for recovery of nickel and also permits removal of non-metal impurities, such as silica and a portion of metal impurities, particularly magnesium and manganese.

Redissolution residue containing the undissolved magnesium and manganese and other impurities such as silica, is separated from the solution and the solids-free ammoniacal nickel ammine carbonate solution preferably is boiled to adjust the carbon dioxide and ammonia contents such that at least a part of the nickel content precipitates from solution as basic nickel carbonate. The $CO_2$-$NH_3$ adjusted system thus comprises a slurry of basic nickel carbonate precipitate in an ammoniacal nickel ammine carbonate solution or, where boiling is conducted to precipitate substantially all dissolved nickel, in water containing only traces of $NH_4^+$, $CO_2$ and nickel. To apply the present invention to this system, the sulphate ion content of the system is adjusted to ensure that there are sufficient sulphate ions in the system to provide at least the stoichiometric amount required to combine with the zinc, magnesium and manganese contaminants in the system as soluble metal sulphates.

There are a number of suitable procedures for effecting the sulphate ion adjustment. A preferred procedure is to add to the system prior to the reduction step a sulphate compound which will dissolve in the system and form soluble sulphates with the contaminant metals but which will not add cations to the system which will precipitate as a contaminant with the nickel in the subsequent hydrogen reduction step. A preferred additive compound is ammonium sulphate. Other sulphate compounds such as sulphuric acid and nickel sulphate may also be employed. The sulphate compound must be provided in sufficient amount to bring the total sulphate ion content of the system up to at least that amount and preferably in slight excess of that amount required to combine stoichiometrically with the metal contaminants in the system as soluble sulphates. The precise quantity of sulphate compound which must be added to the system in any specific case will depend on the amount of sulphate forming metal impurities in the system. This can be readily determined by conventional analytical techniques. In most cases, sulphate compound equivalent to between about one and three g.p.l. of S will be sufficient to tie up metal impurities in the system.

The sulphate ion content of the system may also be adjusted by adding oxidizable sulphur to the system and then reacting it with free oxygen at elevated temperature. Elemental sulphur is preferred for this purpose but compatible sulphide compounds such as nickel sulphide, $H_2S$, $(NH_4)_2S$ and $Na_2S$ may also be employed. The amount of sulphur or sulphur compound added is determined in the same manner as the amount of sulphate compound. Following addition of the required amount of sulphur or sulphur compound, the adjusted system is treated in an oxidation step in order to convert the added sulphur values to sulphate form. For this purpose, the sulphur adjusted system may be charged into a pressure vessel such as an autoclave and heated to a temperature within the range of from about 65° C. to about 260° C., preferably about 175° to about 245° C. The system is actively agitated and an oxygen bearing, oxidizing gas, such as air, oxygen enriched air or oxygen, is fed into the vessel at a rate sufficient to maintain a partial pressure of oxygen above about 5 p.s.i., preferably between about 10 and 20 p.s.i. These operating conditions are maintained until substantially all sulphur not already in sulphate form is oxidized to sulphate. Generally, this requires from about 5 to about 120 minutes. Alternatively, the oxidation may be effected by the addition to the system of compatible oxidizing agents such as ammonium persulphate and hydrogen peroxide.

The above described high temperature oxidation may also be utilized where the sulphate ion adjustment is effected by addition of a sulphate compound such as ammonium sulphate. However, oxidation is not an essential part of the invention in such case but serves to obviate the contaminating effect of any residual, non-oxidized sulphur values which may have been introduced into the reduction system during earlier stages of preparation, e.g. during the cobalt removal step referred to previously.

In any case where the oxidation step is included, preferably the ammonia content of the system is adjusted such that sulphate sulphur in excess of that required to satisfy the stoichiometric requirements of the metal impurities as sulphates is tied up in the system as ammonium sulphate. Such adjustment ensures that substantially all the nickel in the system is precipitated in metallic form in the subsequent reduction step by preventing the formation of free sulphuric acid which tends to redissolve the nickel product.

The sulphate ion and, where necessary, ammonia adjusted slurry is next treated directly in the hydrogen reduction step wherein the nickel content of the system is reduced to elemental form. Methods are well known and in commercial use for recovering nickel from ammoniacal nickel ammine carbonate systems by direct reduction with hydrogen. Such methods are described in detail in U.S. Pats. Nos. 2,734,821 and 3,399,050. Generally, the reducing reaction is carried out at a temperature within the range of about 80° C. to about 315° C., preferably at 150° to 200 °C. under a partial pressure of hydrogen within the range of from about 100 to about 500 p.s.i. The reducing reaction is self-nucleating; that is, no seed or catalyst is required to initiate or promote the direct reduction of the basic nickel compound to elemental nickel. However, seed in the form of nickel powder and/or a reduction catalyst such as anthraquinone may advantageously be added to decrease the total retention time required to effect substantially complete reduction of the nickel to elmental form. The reduction reaction is complete when the consumption of hydrogen ceases, usually from about 15 to about 45 minutes under preferred operating conditions. Precipitated nickel substantially free from contaminating metal impurities is separated from the reaction vessel and, after washing and drying, it is ready for the market.

The following examples illustrate the improved results which are obtained by the practice of the present invention:

EXAMPLE 1

A sample of basic nickel carbonate was precipitated by boiling an aqueous ammoniacal ammonium carbonate leach solution derived from leaching reduced nickeliferous laterite ore. The leach solution had been treated with ammonium sulphite prior to the boiling step to selectively remove the cobalt and copper. This initial basic nickel carbonate precipitate, after washing in sodium carbonate solution to remove sulphate contamination analyzed as shown in column I of the following table.

1750 grams of this basic nickel carbonate precipitate were redissolved in ammoniacal ammonium carbonate solution which was adjusted to provide 50 grams per litre dissolved nickel, an ammonia to nickel molar ratio of 8:1 and a carbon dioxide to nickel molar ratio of 2:1. The solids free solution was steam boiled to remove ammonia and carbon dioxide to precipitate nickel from the solution as basic nickel carbonate. This re-precipitated basic nickel carbonate precipitate analyzed as shown in column II of the following table. 5 grams per litre of ammonium sulphate was added and the system was charged into a high pressure autoclave and heated to 175° C. The slurry was agitated and contacted with oxygen gas under a partial pressure of oxygen of 20 p.s.i. This treatment was continued for 30 minutes.

The slurry was then reacted with hydrogen at a temperature of 175° C. and under a hydrogen partial pressure of 350 p.s.i. The reduction was complete in about 30 minutes. The product was a high purity elemental nickel powder having the analysis shown in column III of the following table.

For purposes of comparison, a sample of the initial basic nickel carbonate precipitate from Example 1 was processed in the same manner as described in Example 1 except that no ammonium sulphate was added to the system prior to oxidation and reduction. The final nickel powder product analyzed as shown in column IV of the following table.

EXAMPLE 2

In this example, a sample of the initial basic nickel carbonate precipitate from Example 1 was processed in the same manner as described in Example 1 except that 1.2 grams per litre of elemental sulphur and 1.1 grams per litre $NH_3$ was added to the system prior to the oxidation step in place of the ammonium sulphate added in Example 1. The final nickel powder product analyzed as shown in column V of the following table in which all amounts are reported as wt. percent.

TABLE

|  | I | II | III | IV | V |
|---|---|---|---|---|---|
| Ni | 46.1 | 45.2 | 99.9 | 99.8 | 99.9 |
| Co | 0.018 | .018 | 0.046 | 0.041 | .012 |
| Cu | 0.003 | .003 | 0.003 | 0.006 | .006 |
| Fe | 0.04 | .0084 | 0.009 | 0.012 | .007 |
| Zn | 0.057 | .014 | 0.003 | 0.027 | .002 |
| Mn | 0.55 | .013 | <0.0005 | 0.012 | .001 |
| Mg | 0.12 | .084 | 0.002 | 0.015 | .003 |
| S_T | 0.26 | .107 | 0.003 | 0.0071 | .011 |
| *$(NH_3)_T$ | 1.37 | .27 | | | |
| $CO_2$ | 10.3 | 12.73 | | | |
| $SiO_2$ | 0.065 | <.01 | <.01 | <.01 | <.01 |

*The subscript T means total ammonia, that is, free ammonia plus ammonia in compound form.

Comparison of the analyses in columns III and V with those in column IV shows the marked decrease in Zn, Mg and Mn contamination obtainable by the method of the invention.

What we claim as new and desire to protect by Letters Patent of the United States is:

1. In the method for the production of nickel from nickel bearing aqueous ammoniacal ammanium carbonate systems containings impurities including at least one of zinc, magnesium and manganese in which the system is reacted with hydrogen at elevated temperature and pressure to precipitate nickel in elemental form substantially free from contamination by said impurities which comprises providing sufficient sulphate ions in the system prior to said reaction with hydrogen such that the system contains at least the stoichiometric amount of sulphate ions required to combine with the said metal contaminants in the system as soluble sulphates.

2. The method according to claim 1 wherein the sulphate ions are provided by the addition to the system prior to the reduction step of a sulphate compound which will dissolve in the system and form soluble sulphates with the contaminant metals but which will not add cations to the system which will precipitate with and contaminate the nickel in the subsequent hydrogen reduction step.

3. The method according to claim 2 wherein the sulphate compound is a member selected from the group consisting of nickel sulphate, sulphuric acid and ammonium sulphate.

4. The method according to claim 1 wherein the amount of sulphate ions provided is such that the system contains the equivalent of between about 1 and 3 grams per litre of sulphur.

5. The method according to claim 1 wherein the sulphate ions are provided by the addition of oxidizable sulphur values to the system and, prior to said reaction with hydrogen, reacting the oxidizable sulphur containing system at an elevated temperature with free oxygen bearing gas to convert said sulphur values to sulphate form.

6. The method according to claim 5 wherein the oxidizable sulphur values are provided by addition of elemental sulphur.

7. The method according to claim 5 including the additional step of adjusting the ammonia content of the system prior to reaction with hydrogen such that there is at least sufficient ammonia therein to form ammonium sulphate with any sulphate ions present in the system in excess of those required to satisfy the stoichiometric requirements of said metal impurities as sulphate.

References Cited

UNITED STATES PATENTS

| | | | |
|---|---|---|---|
| 2,734,821 | 9/1956 | Schaufelberger | 75—108 |
| 2,694,005 | 11/1954 | Schaufelberger | 75—119 X |
| 3,088,820 | 5/1963 | Mackiw et al. | 75—119 X |
| 2,913,334 | 11/1959 | Dean | 75—108 |

FOREIGN PATENTS

| | | | |
|---|---|---|---|
| 811,079 | 4/1969 | Canada | 75—119 |
| 811,078 | 4/1969 | Canada | 75—119 |

L. DEWAYNE RUTLEDGE, Primary Examiner

G. T. OZAKI, Assistant Examiner

U.S. Cl. X.R.

75—103, 119, 0.5 A